United States Patent [19]

Vanderzanden et al.

[11] Patent Number: 5,052,109
[45] Date of Patent: Oct. 1, 1991

[54] REPAIRABLE GUIDE BAR FOR TREE HARVESTERS

[75] Inventors: James L. Vanderzanden, Tigard; Christopher D. Seigneur, West Linn, both of Oreg.

[73] Assignee: Blount, Inc., Portland, Oreg.

[21] Appl. No.: 604,613

[22] Filed: Oct. 26, 1990

[51] Int. Cl.$^5$ .............................................. B23D 57/02
[52] U.S. Cl. ...................................... 30/387; 30/383; 144/34 R
[58] Field of Search ................................ 30/381–387; 144/34 R

[56] References Cited

U.S. PATENT DOCUMENTS

| | | | |
|---|---|---|---|
| 3,726,326 | 4/1973 | Coleman | 144/34 R |
| 3,991,799 | 11/1976 | Albright | 144/34 R |
| 4,641,432 | 2/1987 | Kume | 30/387 X |
| 4,722,141 | 2/1988 | Lim et al. | 30/383 X |
| 4,958,670 | 9/1990 | Johnson | 144/34 R |

*Primary Examiner*—Douglas D. Watts
*Attorney, Agent, or Firm*—Robert L. Harrington

[57] ABSTRACT

A guide bar for a mechanical harvester wherein the guide bar is repairable after bending. The guide bar is provided with a pliable section of lowered hardness in a limited zone between a mounting bracket and the principal cutting portion of the bar. A hinge area is thereby created in the zone area to permit bending of the bar without breaking. Reduced hardness is tolerated in the zone area where the least cutting action is encountered.

12 Claims, 2 Drawing Sheets

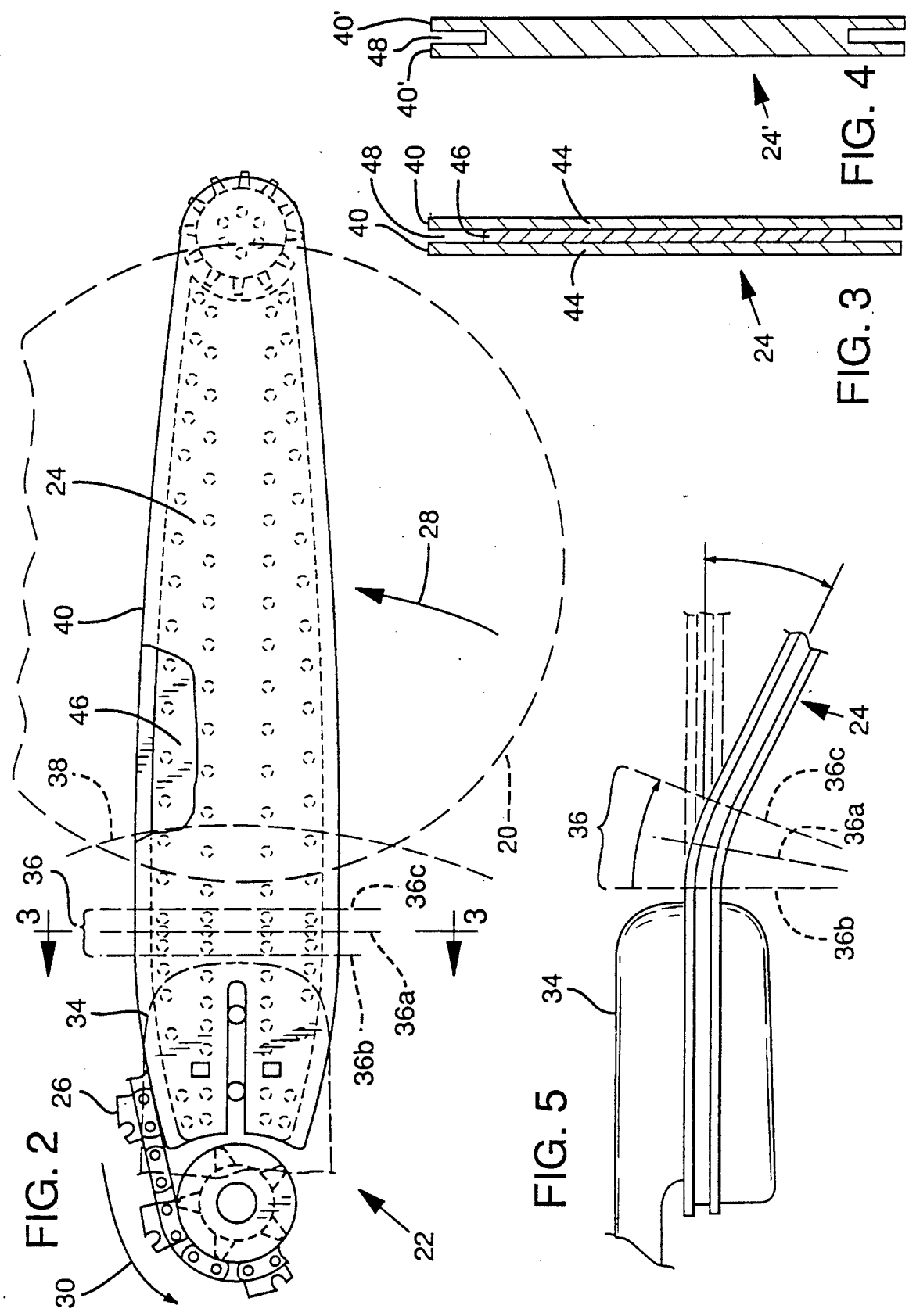

REPAIRABLE GUIDE BAR FOR TREE HARVESTERS

Field of the Invention

This invention relates to guide bars for saw chain used on mechanical tree harvesters and more particularly to a guide bar that is designed to suffer deformation and is repairable for additional service.

Background of the Invention

Mechanical tree harvesters are used for logging trees. They typically consist of a tractor equipped with a boom. A grapple on the end of the boom grips a standing tree. A chain saw located below the grapple and controlled by the operator from the cab of the tractor, severs the tree. The operator maneuvers the boom and grapple to lay the severed tree on the ground and the process is repeated.

The guide bar is mounted on a pivot and the operator initially pivots the bar and chain to a protected position inside a channel of a rigid guard. With the tree held by the grapple, the guide bar and driven saw chain are pivoted out of the guard and through the base of the tree. In the process, the unguarded bar and chain will typically cut through the tree without incident and be returned to the protected position inside the guard prior to the operator maneuvering of the severed tree onto the ground.

The above refers to the normal operation. Not infrequently due to various circumstances that are encountered, the bar and chain are subject to damage. This may occur for example when trees are grouped too close together. A bar and chain will cut through the tree held by the grapple and begin cutting into a closely adjacent tree before the tree held by the grapple is completely severed. When the tree held by the grapple has been severed, the boom will instantly lift the tree. With the bar and chain embedded in the adjacent tree, this movement translates into a bending force applied to the bar. Something has to give which often results in the bar being bent and damaged.

In some cases, the tree trunk is so misshapen that the grapple will not firmly grip the tree. If the grapple loses its grip on the tree during the cutting operation, the tree will slide down against the bar and the bar will be damaged. Operator error is a further possibility. A lifting force is applied to prevent the kerf from collapsing and binding the chain. Too much lifting force applied during the cutting operation can cause the grapple to slide up the tree trunk and again a severe bending force is applied to the bar.

Other examples could be given but the common result of all these occurrences is that the bar becomes bent and most likely damaged. Bending occurs most frequently adjacent the juncture of the mounting bracket at the inner end of the bar. The bend is most often a sharp bend which invariably cracks the bar and renders it non-repairable. Such breakage of the guide bar is a major concern and expense to the mechanical tree harvesting operation and alleviating the problem is an object of the present invention.

BRIEF SUMMARY OF THE INVENTION

A guide bar for a chain saw and particularly as mounted on a tree harvester, is subjected to severe forces that induce rapid wearing. If the guide bar is to have an acceptable life, it must be structured with the optimum of wear resistant capability. With technology as presently known, such wear resistance is only provided by very hard metals and very hard metals do not readily bend. They resist bending until that resistance is overpowered and then they break. Conversely, metal can be made to bend but the very property that permits bending is the property that produces increased wearing.

In a typical guide bar, the body of the bar has one level of hardness and the surrounding edge is hardened further (e.g. by heat treating) to form the guide rails on which the saw chain is entrained. The saw chain being pressed against the rails during the forced cutting operation creates extremely high temperatures and pressures which have to be resisted through hardened surfaces if the bar is to have an effective life. These rail areas will not bend readily and if they crack, the bar becomes useless.

The invention herein is based on the recognition that the area where bending forces are typically applied during the non-typical occurrences of forced deformation of the bar, i.e., at the rear end adjacent the mounting bracket, is also the area where the cutting forces create the least wearing. A bar is not normally buried in the cut to the mounting bracket and even when it is, the cutting action is restricted to a small segment of the tree's total cross section. The greatest cutting action and highest wear problem occurs at the bar center where the chain has to cut through the total tree thickness.

The inventive solution to the problem is thus the provision of a reduced hardness area across a small band of the bar adjacent the mounting bracket (sometimes referred to as the zone of bending). The reduced hardness is selected to permit the necessary bending within the narrow band of the zone while maintaining the wear resistance as high as otherwise permissible. This reduced hardness zone permits bending but at the sacrifice of reduced wear resistance. However, the band of reduced wear resistance is strategically placed in that position where wearing is the lowest and the application of the bending forces is the highest. Because bending thus occurs without breaking or cracking the metal, the bar can be straightened to its original shape or at least close enough to render the bar serviceable for continued operation.

The invention and its advantages will be more fully understood and appreciated with reference to the following detail description including the drawings which are referred to therein.

Brief Description of the Drawings

FIG. 2 is a plan view of the bar and chain used on the tree harvester of FIG. 1, the bar being structured in accordance with the present invention;

FIG. 3 is a section view as taken on section lines 3—3 of FIG. 2;

FIG. 4 is a view similar to FIG. 3 of an alternate bar of the invention;

FIG. 5 illustrates the guide bar of the invention having been subjected to a bending force;

DETAILED DESCRIPTION

Figure 1:
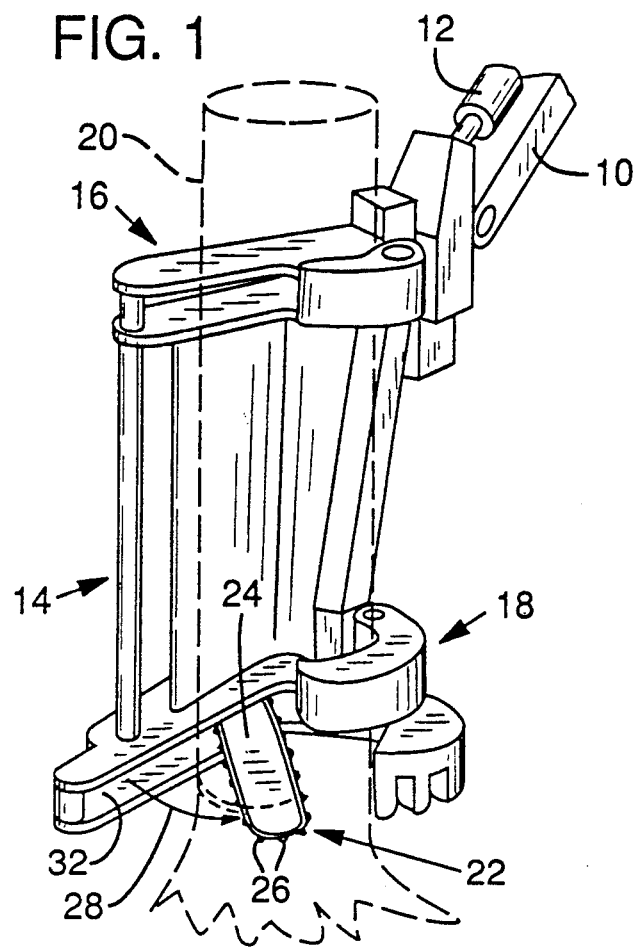
FIG. 1 illustrates the boom end portion of a tree harvester engaged in a cutting operation.

With reference to FIG. 1, illustrated is the end of a boom 10 which is typically mounted to a tractor or the like that is not illustrated. An operator on the tractor operates controls that produce the movement of the boom 10 and the various components involved in the harvesting operation. For example hydraulic cylinder 12 functions to tilt the mast 14 relative to the boom.

As is typical in a mechanical harvester cutting operation, the mast 14 includes upper and lower grapples 16, 18, respectively. The grapples 16, 18 are closed on a tree 20 to secure the mast 14 to the tree. With the mast 14 thus secure, an appropriate lifting force is applied to the mast 14. A chain saw component 22 carried by the mast 14 is activated to pivot the bar 24 and driven chain 26 (the pivoting movement indicated by arrow 28 and the chain drive movement indicated by arrow 30 in FIG. 2) out of its guard channel 32 and through the tree thickness. The lifting force applied to the mast prevents the tree from collapsing on the saw chain.

Reference is now made to FIG. 2 wherein the chain saw components 22 are illustrated in full line except for the mounting bracket 34 shown in dash lines. (The bracket 34 is more clearly illustrated in FIG. 5.) The tree 20 is superimposed in dash lines over the bar 24 in the approximate position as illustrated in FIG. 1. It is to be particularly noted that a zone 36 between the tree 20 and bracket 34 is available for cutting but does not normally participate in the cutting action, i.e., it is located behind or inward from the tree. However, even when zone 36 is involved in the cutting action, the participation is minimal. This will be apparent by noting the extent of cutting that takes place in that area outlined by dash line 36. Assume the tree 20 being shifted rearward to the edge of bracket 34 and it will be appreciated that area 36 of the bar would only pass through a small segment of the tree. These factors coupled together indicate the relatively small cutting action that takes place in the zone 36 of the bar. Wearing of the bar rail 40 is much higher across the portion of the rail inside the tree. Thus, the wear resistance demands at zone 36 is substantially less than in the center of the bar which is always involved in the cutting action.

Should a mishap occur where the bar 24 is bent, it generally occurs near the mounting bracket 34 as shown in FIG. 5. In prior bars, the bend has been tight, i.e., had a small radius, which initiated cracks or even breakage. It was difficult if not impossible to repair the bar under these conditions.

There are a number of factors that enter into the provision of the bend area which is intended for zone 36. A sharp bend radius should be avoided because it creates the greatest stress on the metal and is most likely to produce the undesirable cracking of the rails. Thus, the center of the bend should be moved away from the outer edge of the bracket 34.

From FIG. 2, it should be appreciated that zone 36 is intended to illustrate a section of the bar that is extended about three inches along the bar length starting from about one-half inch from the edge of bracket 34. The bar as illustrated in FIGS. 2 and 3 is a laminate bar. The bar body is produced initially to a hardness in a range of 35-44, and preferably of about 37 Rockwell C. The bar rail 40 is heat treated to a hardness in a range of 55-61, and preferably of about 57 Rockwell C.

Figure 8:
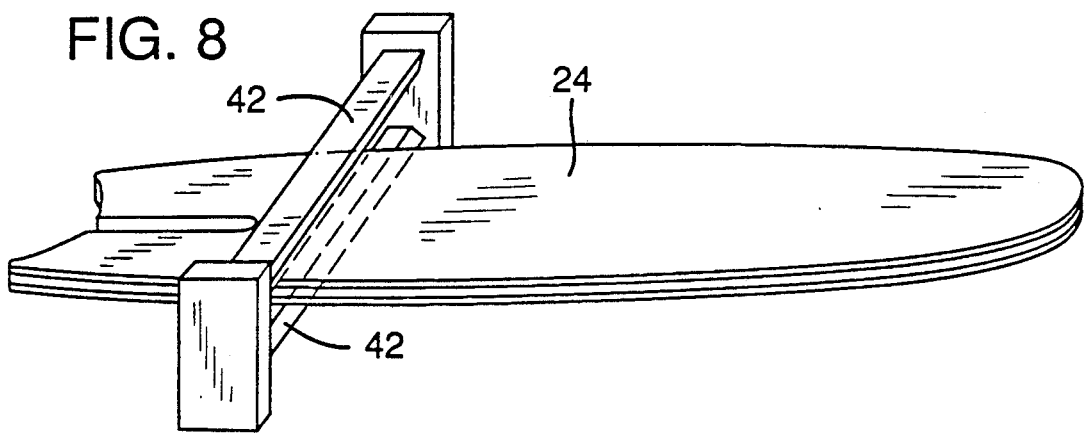
FIG. 8 schematically illustrates a process for producing the reduced hardness zone of either of the alternate versions of FIGS. 3 and 4.

Referring to FIG. 8, the structure is then subjected to a further heat treatment in the zone 36 as indicated by the provision of heating bars 42 that bracket the zone as illustrated. The heat treatment applied reduces the rail hardness across the entire width of the bar within the bracketed area including the bar rails 42. However, the hardness is not reduced by this method to achieve a constant hardness over the entire area of the zone 36 front to back. The center 36a of zone 36 is reduced to a range of 20-30, and preferably about 25 Rockwell C and the hardness of zone 36 increases to the mentioned 37 and 57 Rockwell C hardness (the body and rail portions, respectively) at the front and rear edges 36b, 36c of the zone 36.

The axis of the bend is at or near the center 36a of the zone 36 and is well forward of the front edge of bracket 34. Manufacturing processes that provide a sharper change from hard to soft will require a shorter zone and will preferably be centered on the bend axis indicated for zone 36, e.g. about two inches from the bracket 34.

Figure 6:
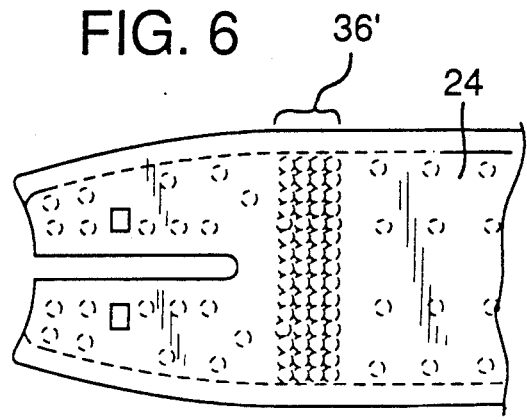
FIGS. 6 and 7 illustrate various construction techniques for constructing the bar of FIG. 3.
Figure 7:
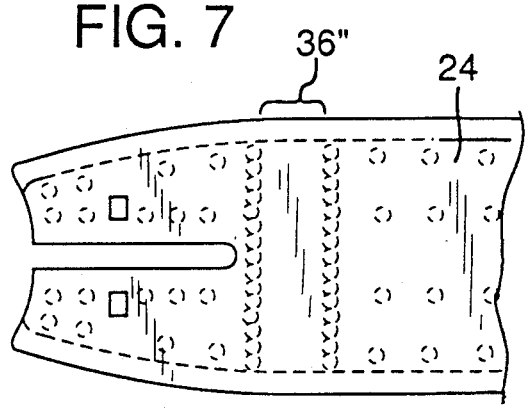

The illustrated preferred guide bar is laminated as previously indicated. The laminated bar does create one further problem. Upon bending the layers of the laminate separate or bulge apart. The metal stretches and even though the bend can be straightened, the stretching renders it difficult or impossible to recapture the original shape. Thus, to cure this, the laminate sections are effectively fused together at the zone 36. FIG. 6 illustrates a zone 36' that is spot welded but wherein the spot welds are grouped close together. FIG. 7 illustrates a zone 36" wherein a process referred to as roller welding achieves an almost total fusion of the laminate layers or sections.

FIG. 3 is of course the laminate bar which is referred to throughout. The two side laminates 44 are separated by a core laminate 46. The core laminate has a reduced configuration relative to the side laminates 44 so as to provide the groove 48 which in turn defines the rails 40 which support the side links of the saw chain.

FIG. 4 represents a solid bar 24' that has a thickness equal to the combined laminates 46 and 44 (both sides). The groove 48' is machined into the edge and forms the side rails 40'.

In either of the above structures of FIGS. 3 and 4, the chain supporting edge of the rails 40, 40' are hardened by an appropriate heat treating process or by application of a thin layer of stellite.

In operation, the harvesting process as explained for FIG. 1 can go awry for any one of a number of reasons. The mast 40 inadvertently shifts upward relative to the tree being severed or in some cases is dropped down onto the tree stump. In one case the bar is bent down as illustrated in FIG. 5 and in the other it is bent up. However, in all material respects, there is no difference between those situations where the bar is bent up or bent down.

As will be noted, the bending action occurs all within the zone 36 and around the center line 36a. Since the material throughout the bar thickness simulates a solid metal plate that has been softened to permit bending, the bend is a smooth bend with minimal deformation. To repair the bar, it is simply forced back to its straight condition which can be accomplished with basic tools that can be carried in the field. In any event, it can be straightened in the shop and returned to service at a substantial savings over the prior practice of simply disposing of the bar. That is because in prior bars the bending that occurs in the zone 36 would invariably generate cracks in the bar body and/or rails 40 and any such cracking would render the bar unusable.

Others skilled in the art will conceive of various modifications to the illustrated design. For example, the zone 36 may be provided by an insert section that is fused front and back to the bar although this would not be considered feasible with current technology. The point is that the invention is not limited to any specific embodiment but instead encompasses all variations as defined by the claims appended hereto.

We claim:

1. A chain saw guide bar for a mechanical tree harvester comprising;

a planar elongated bar having a length and width and defining an inner end having an inner end portion for mounting to a support structure of a mechanical harvester, an outer end and a pair of opposed edges extending between said inner and outer ends, said opposed edges providing guide edges for guiding a driven saw chain from said inner end along one edge to the outer end to be guided around said outer end and back to the inner end along said other edge, a zone designated in said bar extending across the width of the bar from edge to edge, said opposed edges inside said zone being relatively softer than the opposed edges outside said zone, and said zone positioned adjacent to and outward of said inner end portion and extending a limited distance relative to the bar length whereby the majority of cutting action occurs along said edges between said designated zone and the outer end thereof and said relative softness of the bar edges in said zone providing the property of pliability for easier bending of the bar within said zone as compaired to the bar length outside said zone.

2. A chain saw guide bar as defined in claim 1 wherein the material of the bar is steel, and the guide edges beyond the zone are hardened to resist wear and as a result thereof are intolerant to bending without breaking, and wherein said guide edges within said zone are softened to permit bending and have wear resistance properties reduced compared to the guide edges outside said zone.

3. A chain saw guide bar as defined in claim 2, wherein;

said zone has a hardness between 20 and 30 Rockwell C.

4. A chain saw guide bar as defined in claim 3, wherein;

said guide edges are hardened to a first hardness range, said first hardness range defined between 55 and 61 Rockwell C;

a body of said bar is hardened to a second hardness range, said second hardness range defined between 35 and 44 Rockwell C; and, said guide edge of said zone of said bar having a hardness varying from said first hardness range at each edge of said zone decreasing to a third hardness range near a center of said zone, and said body portion of said zone having a hardness varying from said second hardness range at each edge of said zone decreasing to said third hardness range near said center of said zone, said third hardness range defined between 20 and 30 Rockwell C.

5. A chain saw guide bar as defined in claim 4, wherein;

said zone has a length of about three inches, the leading edge of said zone spaced outward from said inner portion a distance of about one-half inch.

6. A chain saw guide bar as defined in claim 2 wherein the guide bar is a laminated structure having laminates that are bonded together, the bonding in said zone being substantially continuous to simulate total fusion of said laminates in said zone.

7. A method of producing a saw chain guide bar for a mechanical harvester comprising;

forming an elongate planar bar having opposed guide edges and inner and outer ends, and providing means for mounting the inner end of the bar to a support structure of the harvester, designating a zone across the bar width including the opposed bar edge portions, said zone located adjacent the inner end beyond the mounting thereof and extending a limited distance toward the outer end, discriminately hardening the guide edges to have hardened wear resistant to generally non-bendable guide edges outside the zone and being bendable within said zone and as a result thereof being relatively less wear resistant within said zone.

8. A method as defined in claim 7, including;

hardening the entire bar length to obtain a consistent wear resistant hardness, and discriminately treating the bar in said designated zone area to reduce the hardness in said zone and thereby permit bending of the bar without breaking.

9. A method as defined in claim 8, wherein;

treating the bar in said designated zone reduces the hardness of said zone to a range between 20 and 30 Rockwell C.

10. A method as defined in claim 9, including;

hardening said guide edges to a first hardness range, said first hardness range defined between 55 and 61 Rockwell C;

hardening a body of said bar to a second hardness range, said second hardness range defined between 35 and 44 Rockwell C; and, treating said designated zone of said bar resulting in a hardness of said guide edges of said zone varying from said first hardness range at each edge of said zone decreasing to a third hardness range near a center of said zone, and resulting in a hardness of said body portion of said designated zone having a hardness varying from said second hardness range at each edge of said zone decreasing to said third hardness range near said center of said zone, said third hardness range defined between 20 and 30 Rockwell C.

11. A method as defined in claim 10, including;

defining the length of said zone at about three inches, and spacing a leading edge of said zone at a distance of about one-half inch adjacent the inner end beyond the mounting thereof.

12. A chain saw guide bar for a mechanical tree harvester comprising:

a planar elongated bar having a length and width and defining an inner end having an inner end portion for mounting to a support structure of a mechanical harvester, an outer end and a pair of opposed edges extending between said inner and outer ends, said opposed edges providing guide edges for guiding a driven saw chain from said inner end along one edge to the outer end to be guided around said outer end and back to the inner end along said other edge, a zone designated in said bar extending across the width of the bar from edge to edge, said opposed edges inside said zone being relatively softer than the opposed edges outside said zone, and said zone positioned outward of said inner end portion and extending a limited distance relative to the bar length and said relatively softness of the bar edges in said zone providing the property of pliability for easier bending of the bar within said zone as compared to the bar length outside said zone.

* * * * *